(12) United States Patent
Doll et al.

(10) Patent No.: US 10,689,529 B2
(45) Date of Patent: Jun. 23, 2020

(54) PIGMENTS FOR FILTERING THE SOLAR SPECTRUM

(71) Applicant: Sun Chemical Corporation, Parsippany, NJ (US)

(72) Inventors: Jonathan Daniel Doll, Cincinnati, OH (US); Paul Andrew Merchak, Hamilton, OH (US); John Aldred Nimmo, Tonbridge (GB); Aaron M. Hollman, Hebron, KY (US)

(73) Assignee: SUN CHEMICAL CORPORATION, Parsippany, NJ (US)

( * ) Notice: Subject to any disclaimer, the term of this patent is extended or adjusted under 35 U.S.C. 154(b) by 0 days.

(21) Appl. No.: 15/303,127

(22) PCT Filed: Apr. 9, 2015

(86) PCT No.: PCT/US2015/025116
§ 371 (c)(1),
(2) Date: Oct. 10, 2016

(87) PCT Pub. No.: WO2015/157521
PCT Pub. Date: Oct. 15, 2015

(65) Prior Publication Data
US 2017/0029635 A1 Feb. 2, 2017

Related U.S. Application Data

(60) Provisional application No. 61/978,512, filed on Apr. 11, 2014.

(51) Int. Cl.
| | | |
|---|---|---|
| *C09D 5/32* | (2006.01) | |
| *C09D 5/00* | (2006.01) | |
| *C09D 7/40* | (2018.01) | |
| *C09D 7/61* | (2018.01) | |
| *C09D 7/41* | (2018.01) | |
| *C09D 7/62* | (2018.01) | |
| *C09B 48/00* | (2006.01) | |
| *C09D 5/36* | (2006.01) | |
| *C08K 13/08* | (2006.01) | |

(52) U.S. Cl.
CPC .............. *C09D 5/32* (2013.01); *C09B 48/00* (2013.01); *C09D 5/00* (2013.01); *C09D 5/36* (2013.01); *C09D 7/41* (2018.01); *C09D 7/61* (2018.01); *C09D 7/62* (2018.01); *C09D 7/70* (2018.01); *C08K 13/08* (2013.01)

(58) Field of Classification Search
USPC ......................................... 428/216; 252/500
See application file for complete search history.

(56) References Cited

U.S. PATENT DOCUMENTS

| | | | |
|---|---|---|---|
| 4,090,773 A | 5/1978 | Bauer et al. | |
| 4,895,904 A | 1/1990 | Allingham | |
| 5,667,580 A * | 9/1997 | Babler | C08K 3/34 |
| | | | 106/499 |
| 6,017,981 A | 1/2000 | Hugo | |
| 6,441,059 B1 | 8/2002 | Kieser et al. | |
| 6,602,340 B1 | 8/2003 | Schank et al. | |
| 6,692,824 B2 | 2/2004 | Benz et al. | |
| 6,989,056 B2 | 1/2006 | Babler | |
| 7,169,222 B2 | 1/2007 | Bruckner et al. | |
| 7,410,685 B2 | 8/2008 | Rosenberger et al. | |
| 8,505,237 B2 | 8/2013 | Vitale et al. | |
| 2002/0192448 A1 * | 12/2002 | Schoen | C09C 1/0036 |
| | | | 428/216 |
| 2010/0233146 A1 | 9/2010 | McDaniel | |

FOREIGN PATENT DOCUMENTS

| | | | |
|---|---|---|---|
| EP | 1 844 656 A1 | 10/2007 | |
| JP | WO20120167865 | * 12/2012 | |
| WO | WO 2012/167865 A1 | 12/2012 | |

OTHER PUBLICATIONS

Herbst, W., et al., *Industrial Organic Pigments: Production, Properties, Applications*, 2nd Ed., VCH Publishing Company, Weinheim, Germany, 1997, 3 pgs.
Klein, G.A., *Industrial Color Physics*, Springer Series in Optical Sciences, vol. 154, p. 64, 2010, 2 pgs.
Zorll, Dr., U., Ed., Rompp Lexikon, *Lacke and Druckfarben (Paints and Printing Inks)*, Georg Theime Verlag, Stuttgart, Germany, 1998, 5 pgs.
European Examination Report dated Aug. 2, 2017 for Application No. EP 15 718 708.9, 6 pgs.
International Search Report and Written Opinion dated Jun. 26, 2015 for Application No. PCT/US2015/025116, 9 pgs.

* cited by examiner

*Primary Examiner* — Monique R Peets
(74) *Attorney, Agent, or Firm* — Karlyn A. Schnapp; Howard C. Lee

(57) ABSTRACT

The present technology relates to a transparent coating system or film which comprises a transparent, polymeric material, one or more pearlescent pigments, and one or more transparent dyes, organic pigments, organic pigment derivatives or inorganic pigments. The coating may be used to give well-defined transmission and reflection spectra in the visible region while having a high degree of reflection in the NIR region.

14 Claims, 2 Drawing Sheets

PIGMENTS FOR FILTERING THE SOLAR SPECTRUM

CROSS-REFERENCE TO RELATED APPLICATIONS

This application claims priority to U.S. provisional application No. 61/978,512, entitled, "Pigments for Filtering the Solar Spectrum," filed Apr. 11, 2014, which is incorporated by reference herein in its entirety.

BACKGROUND

Pigments and dyes have typically been used to impart color to objects that are otherwise uncolored. Pigments generate color by two main pathways: 1) absorption; and 2) interference.

Traditional pigments and dyes typically generate color by absorption of certain wavelengths of light, while reflecting or transmitting other wavelengths. The reflected or transmitted light corresponds to the color seen when observing a surface that has been coated with or contains organic pigments. For example, a typical "blue" pigment will absorb yellow and red light but it will reflect or transmit blue light, as well as a fraction of violet and green light.

Pearlescent pigments do not typically generate color by absorption and instead, light interference is used for coloration. In these pigments, a reflective substrate is coated by one or more layers of an inorganic material with a different refractive index. As light interacts with the pigment, some light is reflected and some light is transmitted. Depending on the thickness of the inorganic coating, different wavelengths can be reflected or transmitted. This is due to constructive or destructive interference, which can amplify or negate the transmitted or reflected light. Generally, the reflected light does not match the transmitted light, leading to different colors depending on the viewing mode. These colors are known as complimentary colors.

Another interesting feature of pearlescent pigments is that they are also known to reflect near-infrared (NIR) and/or infrared light depending on the materials of composition and the layer structure of the pigment. To these ends, there have been a number of applications where pearlescent pigments have been used to reduce the transmission of near-infrared light, thus producing a thermal insulation effect.

Coatings or plastic sheeting that contain light-reflecting particles for infrared reflection and are transparent to visible light may be used in greenhouses. Additionally, pearlescent pigments may be used as a way to reflect NIR light for the heating and cooling of buildings.

More recently, pigments that have both NIR reflectance and exhibit control over the visible light have been described. Many of these pigments are comprised exclusively of pearlescent pigments that have a color due to interference.

In this technology, we have found that combining traditional pigments and/or dyes with pearlescent pigments in a transparent coating system and/or film provides a means to achieve high degree of control over the visible light spectrum while still having a high degree of NIR reflectance. These coating systems are well suited for use in many applications including decorative, insulating and greenhouse coatings and films where a high degree of spectral control in addition to NIR reflectance is desired.

Due to the cost-sensitive nature of greenhouse maintenance, inexpensive and effective solutions are required. Two major issues important to greenhouses are to: 1) increase the efficiency of crop growth; and 2) increase the efficiency of heating and cooling in greenhouses through the different growing seasons. One way to increase the efficiency of crop growth is to only allow specific wavelengths of light into a greenhouse. The specific spectrum required is the PAR spectrum, with focus on the RFR region, which can affect different crops. Likewise, the efficiency of heating and cooling can be increased by incorporating NIR-reflective materials into greenhouse windows or window coatings that help mitigate heat loss or transmission in the greenhouse.

Plants typically require a specific visible light spectrum, known as photosynthetically active radiation (PAR), in order to achieve the most efficient growth. The PAR region is located in the visible light region of the electromagnetic spectrum between the wavelengths of 400-750 nm. Plants are most sensitive to red and orange light (590-750 nm), followed by blue light (400-495), while they are least sensitive to green and yellow light (495-590 nm). Accordingly, the plants grow most efficiently in an environment where the fraction of green and yellow light is reduced. Furthermore, there is some seasonal variation to the PAR spectrum depending on the growth stage and type of the plants.

Greenhouse owners would like a coating that selectively filters green light while transmitting blue and yellow light. An additional requirement of such a coating is that the transmission of near-infrared (NIR) light is optimized so as to allow better temperature control in the winter and summer months. A further requirement of the coating is to allow some ultraviolet light transmission so that pollinators can navigate the greenhouses. Another important parameter in plant growth is something called the "Red to Far Red" (RFR) ratio. This is a measure of the red light at 660 nm to the far-red light at 730 nm and determines whether a plant will grow tall or wide. An ideal greenhouse coating: 1) Will transmit a well-defined PAR spectrum with fine-tuned RFR ratios; and 2) Exert control over the NIR transmission. These combined issues require an NIR-reflecting pigment with a high degree of spectral fidelity in the visible region.

The pigments used in greenhouses must have high light and weatherfastness. Certain absorption pigments typically have better performance in this regard. The absorption pigments used in the transparent coating system and/or film of the present technology come from all types of pigment classes and include dyes, organic pigments, organic pigment derivatives and/or inorganic pigments.

Absorption pigments generate color through the absorption of light. When light interacts with these pigments, certain wavelengths are absorbed and the remainder of the light is reflected and/or transmitted. The reflected light spectrum is similar to the transmitted light spectrum and corresponds to the observed color. Moreover, the reflected an transmitted light spectra have well defined peaks and sharp transitions, allowing for bright and vibrant colors.

Pearlescent pigments are pigments that generate color by the interference of light. In pearlescent pigments one or more layers of a high-refractive index material envelops a transparent, plate-shaped substrate. Depending on the thickness of the layers in the pearlescent pigment, different wavelengths of light are constructively and destructively interfered, leading to color generation. Often, the reflected light is different than the transmitted light, and pearlescent pigments can have different spectra when viewing them in transmission or reflection modes.

The use of pearlescent pigments as a NIR reflecting pigment is well known. Pearlescent pigments have been known to reflect certain wavelengths of visible light while transmitting others, allowing spectral tunability in the visible region for both reflected and transmitted light. These properties allow pearlescent pigments to be used in applications such as heat reflectors in architectural paints or as light filters in greenhouse coatings. Although, pearlescent pigments reflect and transmit visible light, the individual spectra are inadequate. This is because the interference peaks are typically shallow and/or broad leading to faint coloration. For many applications such as decorative and greenhouse coatings, sharper transitions and narrower peaks are desired in the visible region.

Organic and inorganic pigments (i.e. absorption pigments) have also been used as materials in light-filtering applications. These pigment systems are used when more spectral control is needed in the visible region and have been used in similar applications as pearlescent pigments: heat reflecting architectural paints or as light filters in greenhouse coatings. Although the use of these pigments provides excellent control of the visible light spectrum, these pigments do not have appreciable NIR reflectance. Furthermore, they do not have the transparency of pearlescent pigments which is required for certain applications.

Much of the technology directed to greenhouse design focuses on only one parameter. For example, the use of absorption pigments for greenhouse coatings provides excellent control over the PAR region of the spectrum but these pigments are not active in the NIR and thus no improvement in heating/cooling efficiency is maintained. Conversely, when greenhouses use pearlescent pigments, NIR reflectance is enhanced, but fine control over the visible light is not achieved. Moreover, most of the pearlescent pigments used in greenhouse systems, like the Merck Solarflair®, are comprised of multiple layers of inorganic oxides and can be difficult and/or expensive to make.

In the prior art, either all absorption or all interference pigment systems are used to tune absorbance, transmittance and reflectance spectra from the visible to the NIR regions of light. The present technology describes the use of absorption pigments in combination with pearlescent pigments. The combination of organic pigment and pearlescent pigment makes control of the transmission and reflection spectra in the visible and the NIR regions much easier. Thus, the combination of one or more pearlescent pigments and one or more absorption pigments is blended into a transparent coating system and/or film to aid in the spectral control of both visible and NIR light.

BRIEF SUMMARY

The coating system and/or film reported herein takes into account the shortcomings of agricultural coatings containing only pearlescent pigments or organic pigments and are intended for use in a number of applications, including light filtration and/or decorative applications. These difficulties are overcome by combining a pearlescent pigment with an absorption pigment. This development gives fine control over the visible light transmission and reflection of the pigments while maintaining a high degree of NIR reflection. Moreover, the combination of these two classes of pigments can give "two-tone" effects where the reflection is markedly different than the transmission as shown in some examples. This allows these coatings to be used in specialty applications where precision in spectral filtering is needed, such as greenhouse coatings. Moreover, these coatings offer more control over the complete solar spectrum that enters the greenhouse, surpassing the current technology.

The coating system and/or film has customizable light transmission and reflection in the visible spectrum. This coating system and/or film also has good NIR reflectance and display acceptable lightfastness and weatherability. The coating is comprised of a pearlescent pigment and an absorption pigment. One embodiment of this technology has a tailored transmission spectrum which is similar to the PAR spectrum, allowing for its use in greenhouse applications. Other embodiments are intensely colored when applied, having high chroma and allowing for use in decorative applications where an iridescent effect is desired.

These transparent coating systems and/or films differ from transparent coating systems and/or films described in the art in that they show a highly tunable spectrum in the visible light spectrum, strongly reflect NIR light and allow for tunability of the RFR ratio.

DETAILED DESCRIPTION

Figure 1:
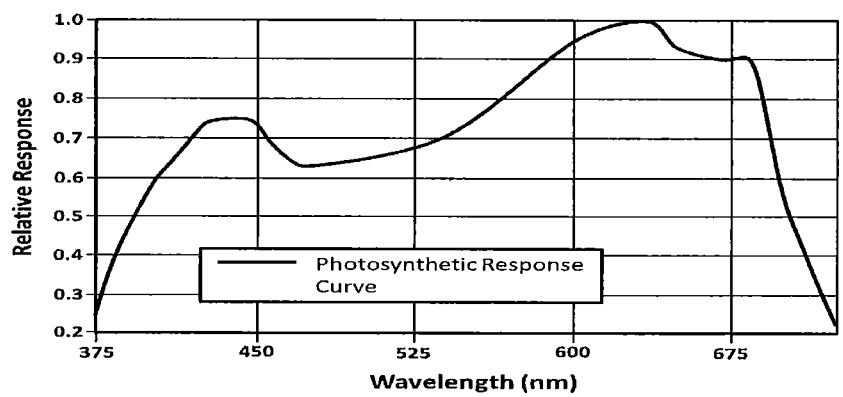
FIG. 1: Diagram of the PAR spectrum in the visible region

The present technology relates to a transparent coating system and/or film which comprises a transparent polymeric material, one or more pearlescent pigments and one or more absorption pigments. The absorption pigment may include one or more transparent dyes, organic pigments, organic pigment derivatives and inorganic pigments. The coating system and/or film may be used to give well-defined transmission and reflection spectra in the visible region while having a high degree of reflection in the NIR region.

The total pigment loading in the coating system is in the range of about 0.1%-40%, by weight, with respect to the absorption pigment weight of the wet coating. In another embodiment, the total pigment loading is about 0.5-20%, by weight. In another embodiment, the total pigment loading is between about 1%-6%, by weight.

In one embodiment, the pearlescent pigment is added to the transparent coating system of the present technology. In this embodiment, the pearlescent pigment is added in the range of about 0.1%-39.9% with respect to the total weight of the coating system. In another embodiment, the absorption pigment is added to the transparent film of the present technology. In this embodiment, the absorption pigment is added in the range of about 0.1%-39.9% with respect to the total weight of the film.

The coating system may also be used to focus one or more visible wavelength regions of light in transmission and/or reflection viewing modes while increasing the NIR reflectance.

The transparent coating system and/or film can display many different colors. These include "two-tone" colors where the reflectance spectrum is different from the transmission spectrum, and monotone colors where the reflectance spectrum is similar to the transmission spectrum. The transparent coating system and/or film also shows excellent NIR reflectance. The transparent coating system and/or film offers an excellent means of spectral control through the visible and NIR regions of the electromagnetic spectrum and can thus be used to coat architectural structures, windows, sunroofs, greenhouses, and/or other articles where spectral control is required.

In general, the transparent coating systems and/or films of the present technology are made by dispersing the pearlescent pigments and the absorption pigment along with a transparent polymeric material, such as a resin system suitable for a coating system and/or film. Polymeric materials that have a high degree of transparency in the visible and NIR regions of the electromagnetic spectrum is one embodiment. In another embodiment, the pearlescent pigment/s as well as the absorption pigment are sufficiently transparent in the visible region. The absorption pigment should also have an absorption spectrum in the visible region. In another embodiment, the pearlescent pigment, and/or the absorption pigment are less transparent and/or reflective in the NIR region.

The term "visible region" is taken to mean the wavelength range of 400 nm to 750 nm. The term "NIR region" is taken to mean the wavelength range of 750 nm to 2500 nm. By "transparent," it is meant that the transparent coating system and/or film, for instance, with a total pigment loading of 5%, by weight, transmits between 40-85% of the total light in the wavelength range. By "reflective", it is meant that the transparent coating system and/or film, at a total pigment loading of 5%, by weight, reflects between 10-40% of the total light in the wavelength range.

Additionally the transparent coating system and/or film of the present technology may have specific and tunable reflectance and transmission in the visible region. The reflectance and transmission in the visible region can be tailored to give two-tone or monotone colors depending on the application of the transparent coating system and/or film of the present technology. The exact transmission spectrum in the visible region of the transparent coating system and/or film depends on the identity, type and loading of the pearlescent pigment and the transparent dye, organic pigment, organic pigment derivative or inorganic pigment.

By two-tone colors, it is meant that the transparent coating system and/or film transmits a different spectrum than what it reflects or that the color when looking through the transparent coating system and/or film or when the transparent coating system and/or film is viewed on a white background is different than the color viewed when the transparent coating system and/or film is reflecting light and/or when the transparent coating system and/or film is viewed on a black background.

By monotone colors, it is meant that the transparent coating system and/or film transmits a sufficiently similar spectrum than what it reflects or that the color when looking through the transparent coating system and/or film or when the transparent coating system and/or film is viewed on a white background is similar to the color viewed when the transparent coating system and/or film is reflecting light and/or when the transparent coating system and/or film is viewed on a black background.

The transparent coating system and/or films of the present technology have an absorption spectrum in the visible region. The absorption spectrum in the visible region corresponds to the absorption spectrum of the absorption pigment. The absorption spectrum in the visible region can also correspond to the absorption spectrum of the metal oxide layer that is on the pearlescent pigment. This is generally the case when the metal oxide layer on the pearlescent pigment is comprised of a colored oxide.

In one embodiment, the transparent coating system and/or film is applied to a window, such as those found in a greenhouse, in order to transmit a specific spectrum of visible light that passes through the window. In such a case, a spectrum of light is transmitted that is favorable to plant growth while reflecting a spectrum of light that is not favorable to plant growth. Additionally, the spectrum of light transmitted is similar to the photosynthetically active radiation (PAR) spectrum as outlined by the spectrum shown in FIG. 1.

The degree of solar transmission and reflection by the transparent coating system and/or film can be quantified by using the total solar transmittance (TST) and total solar reflectance (TSR) equations. The TST is defined in equation 1:

$$\% \, TST = \frac{\int \% \, T \cdot Id\lambda}{\int Id\lambda} \cdot 100. \tag{1}$$

Where % T is the percent transmission, I is the solar irradiance and dλ is the wavelength interval of integration. Similarly, the TSR is defined as:

$$\% \, TSR = \frac{\int \% \, R \cdot Id\lambda}{\int Id\lambda} \cdot 100, \tag{2}$$

where % R is the percent reflection.

The background TSR and TST of the substrate and unpigmented coating can be removed to give the approximate TSR and TST of the blended pearlescent pigment and the dyes, organic pigments, organic pigment derivatives or inorganic pigments.

The background correction for the TST is described by equation 3:

$$TST_p = \frac{TST_{p+c}}{TST_c} \cdot 100, \tag{3}$$

where $TST_p$ is the TST of the blended pearlescent pigment and the dyes, organic pigments, organic pigment derivatives or inorganic pigments, $TST_c$ is the TST of the unpigmented coating and substrate and $TST_{p+c}$ is the total TST of all of the components.

Similarly, the background correction for the TSR is described by equation 4:

$$TSR_p = TSR_{p+c} - TSR_c \tag{4},$$

where $TSR_p$ is the TSR of the blended pearlescent pigment and the dyes, organic pigments, organic pigment derivatives or inorganic pigments, $TSR_c$ is the TSR of the unpigmented coating and substrate and $TSR_{p+c}$ is the total TSR of all of the components.

In one embodiment, the TSR of the pigment blend in the transparent coating system and/or film of the present technology, for instance, at a total pigment loading of about 5%, by weight, is preferably in the range of about 10%-40% in the wavelength range of about 400 nm-2500 nm. Additionally, the TST of the pigment blend in the transparent coating system and/or film of the current technology, for instance, at a total pigment loading of about 5%, by weight, is preferably in the range of about 40%-85% in the wavelength range of about 400 nm-2500 nm.

In one embodiment, the light reflection in the NIR region is greater than the reflection in the visible region. For this embodiment, the TSR of the pigment blend in the transparent coating system and/or film of the current technology with, for instance, a total pigment loading of about 5%, by weight, is in the range of about 10%-40% in the wavelength range of about 750 nm-2500 nm. Additionally, the TSR in the visible region is preferably lower, and is in the range of about 5%-35% in the wavelength range of about 400 nm-750 nm.

In the case where the transparent coating system and/or film of the current technology is, for instance, on a greenhouse window at about 5%, by weight, total pigment loading, with respect to the wet coating applied to the window, then the pigment blend in the transparent coating system and/or film has a TST in the range of about 40%-70% between the wavelength of about 400 nm and 495 nm, a TST of about 25%-65% between the wavelengths of about 495 nm and 590 nm, and a TST of about 60%-95% between the wavelengths of about 590 nm and 750 nm. Additionally, one embodiment is, for instance, a total pigment loading at 5%, by weight, in the transparent coating system and/or film having a TSR in the range of about 5%-20% between the wavelengths of about 400 nm and 495 nm, a TSR of about 10%-30% between the wavelengths of about 495 nm and 590 nm, and a TSR of about 5%-20% between the wavelengths of about 590 nm and 750 nm.

In the case where the transparent coating system and/or film of the current technology is on a greenhouse window, it is preferable that the transparent coating system and/or film displays tunability in the red-to-far red (RFR) ratio. The term "RFR ratio" is meant to describe the ratio of the transmission of the light at 660 nm to the transmission of the light at 730 nm. By changing the components of the transparent coating system and/or film of the current technology, the RFR ratio can be tuned from 0.5 to 2.0.

The spectrum of the transparent coating system and/or film of the current technology may be simulated prior to design. The simulated spectra can be made in both reflectance or transmission mode. The simulation should take into account the absorption spectra from the one or more transparent dyes, organic pigments, organic pigment derivatives or inorganic pigments as well as the reflectance, transmission and absorption of the one or more pearlescent pigments and one or more transparent polymeric binders. The concentration of all of the components will also be simulated so as to take into account any concentration-based effects. From the simulated spectra, the TSR, TST and RFR-ratio can be predicted.

The absorption pigment and the pearlescent pigment may be added to the transparent coating system and/or film either as dry colors or as a predispersed tinting base. If the one or more absorption pigments and the pearlescent pigment are added as predispersed tint bases, they can be either in aqueous or solvent based dispersions. The predispersed tint bases can be added in ratios as suggested by the simulation. Any pigment may be used in the predispersed tint bases.

The pearlescent pigment used in the transparent coating system and/or film of the current technology can be any pearlescent pigment known to those skilled in the art. Pearlescent pigments are comprised of a transparent, non-metallic, platelet-shaped substrate that is coated with one or more layers comprised of metal oxides having refractive indices. The pearlescent pigment can be either single or multilayered. In the case where multiple layers of metal oxides are used, these may be layered so that there is at least a difference of 0.1 in the refractive indices of the consecutive layers. The pearlescent pigment may have an interference color when viewed over a black background. The interference color of the pearlescent pigment is silver, yellow, gold, cyan, magenta, red, blue, green, violet, and shades of the aforementioned. The pearlescent pigment of the current technology may have higher light transmission in the visible region of the electromagnetic spectrum than in the NIR region of the spectrum.

The non-metallic platelet substrate can be made of any material that can be used to make a pearlescent pigment, including, but not limited to natural mica, synthetic mica, bismuth oxychloride, graphite, aluminum oxide, micaceous iron oxide, perlite, silicon dioxide, titanium dioxide-coated mica and iron oxide-coated mica, among others. The size of the platelet-shaped substrate is not critical and depends on the end use of the pigment. In general, the diameter of the platelet-shaped substrate can be in the range of, but is not limited to, about 1 µm to 500 µm and the thickness of the platelet-shaped substrate can be in the range of, but is not limited to, about 5 nm to 1 µm.

For the pearlescent pigment used in the transparent coating system and/or film of the current technology, the non-metallic platelet substrate is coated with one or more layers of a variety of metal oxides. Metal oxides used to coat the non-metallic platelet substrate preferably include silicon dioxide, titanium dioxide, zinc oxide, zirconium dioxide, tin oxide, cerium dioxide, vanadium (IV) oxide, manganese oxide, lead oxide, chromium oxide, iron oxide, aluminum oxide, tungsten oxide, and mixtures and alloys thereof. The coating may also be comprised of a hydrated oxide of any one of the aforementioned oxides. The coating system may also be a doped oxide of any one of the aforementioned In one embodiment, the coating system is comprised of colorless metal oxide layers. The thickness of the metal oxide layers are variable but must allow for partial transparency. In general, the thickness of the metal oxide layers is preferably in the range of about 20 nm to 350 nm.

The absorption pigment can be any transparent dye, organic pigment, organic pigment derivative or inorganic pigment are known to those skilled in the art. The absorption pigment should be weather and/or lightfast, but this is not a requirement for performance in the end application. The absorption pigment may be blended into the transparent coating system and/or film of the current technology or it may be attached physically and/or chemically adsorbed to the surface of the pearlescent pigment.

Transparent dyes include, but are not limited to azo or azo condensed, a metal complex, benzimidazolones, azomethines, methines such as cyanines, azacarbocyanines, enamines, hemicyanines, streptocyanines, styryls, zeromethines, mono-, di-, tri-, and tetraazamethine; caratenoids, arylmethane such as diarylmethanes and triarylmethanes; xanthenes, thioxanthenes, flavanoids, stilbenes, coumarins, acridenes, fluorenes, fluorones, benzodifuranones, formazans, pyrazoles, thiazoles, azines, diazines, oxazines, dioxazines, triphenodioxazines, phenazines, thiazines, oxazones, indamines, nitroso, nitro, quinones such as hydroquinones and anthraquinones; rhodamines, phthalocyanines, neutrocyanines, diazahemicyanines, porphyrazines, porphirines, perinones, rylenes, perylenes, pyronins, diketopyrrolopyrroles, indigo, indigoids, thioindigo, indophenols, naphthalimides, indolenes, isoindolines, isoindolinones, iminoisoindolines, iminoisoindolinones, quinacridones, flavanthrones, indanthrones, anthrapyrimidines, quinophthalones, isoviolanthrones, pyranthrones, or any combination thereof.

Organic pigments include but are not limited to azo pigments, polycylic pigments, anthraquinone pigments including monoazo pigments, disazo pigments, disazo condensation pigments, naphthol pigments, benzimidazolone pigments, isoindolinone pigments, isoindoline pigments, metal complex pigments, quinacridone pigments, perylene pigments, carbon black pigments, phthalocyanine pigments, perinone pigments, diketopyrrolo-pyrrole pigments, carmine, thioindigo pigments, anthropyrimidine pigments, flavanthrone pigments, anthanthrone pigments, dioxazine pigments, triarylcarbonium pigments, quinophthalone pigments, or any combination thereof.

Organic pigment derivatives include, but are not limited to azo pigments, polycylic pigments, anthraquinone pigments including monoazo pigments, disazo pigments, disazo condensation pigments, naphthol pigments, benzimidazolone pigments, isoindolinone pigments, isoindoline pigments, metal complex pigments, quinacridone pigments, perylene pigments, carbon black pigments, phthalocyanine pigments, perinone pigments, diketopyrrolo-pyrrole pigments, thioindigo pigments, anthropyrimidine pigments, flavanthrone pigments, anthanthrone pigments, dioxazine pigments, triarylcarbonium pigments, quinophthalone pigments, or any combination thereof. For the case where an organic pigment derivative is used for the transparent dye, organic pigment, organic pigment derivative or inorganic pigment the organic pigment derivative is preferably functionalized with an acid group such as a sulfonic acid, a carboxylic acid, a phosphoric acid or a phosphonic acid.

Inorganic pigments include, but are not limited to titanium oxides, iron oxides, vanadium oxides, chromium oxides, manganese oxides, tungsten oxides, cadmium sulfides, zinc sulfides, cadmium mercury sulfides, iron sulfides, ammonium manganese pyrophosphates, aluminosilicates, ferric ferrocyanide, aluminum oxides, cerium oxides, spinel pigments, lanthanum hexaborides and mixtures and alloys thereof.

Additionally, any mixture of transparent dye, organic pigment, organic pigment derivative or inorganic pigment is acceptable. Additionally, in the case where a dye is used, the dye may be a polymeric or a non-polymeric dye.

Preferably, the absorption pigment has a color best described as red, magenta, maroon Bordeaux or violet. Illustrative examples of such pigments are, C.I. Pigment Violet 1, C.I. Pigment Violet 14, C.I. Pigment Violet 15, C.I. Pigment Violet 16, C.I. Pigment Violet 19, C.I. Pigment Violet 23, C.I. Pigment Violet 29, C.I. Pigment Violet 32, C.I. Pigment Violet 55, C.I. Pigment Violet 209, C.I. Pigment Red 7, C.I. Pigment Red 23, C.I. Pigment Red 31, C.I. Pigment Red 48:1, C.I. Pigment Red 48:2, C.I. Pigment Red 49:1, C.I. Pigment Red 49:2, C.I. Pigment Red 52:1, C.I. Pigment Red 57:1, C.I. Pigment Red 60:1, C.I. Pigment Red 63:1, C.I. Pigment Red 81, C.I. Pigment Red 81:2, C.I. Pigment Red 101, C.I. Pigment Red 108, C.I. Pigment Red 122, C.I. Pigment Red 147, C.I. Pigment Red 169, C.I. Pigment Red 179, C.I. Pigment Red 184, C.I. Pigment Red 185, C.I. Pigment Red 202, C.I. Pigment Red 210, C.I. Pigment Red 224, C.I. Pigment Red 254, C.I. Pigment Red 264 and C.I. Pigment Red 269.

When an organic or inorganic pigment is used for the transparent dye, organic pigment, organic pigment derivative or inorganic pigment, the particle size is may render the dye, organic pigment, organic pigment derivative or inorganic pigment transparent. Although the d50 value changes depending on the type of dye, the d50 will preferably be <500 nm.

The absorption pigment may also be attached to the surface of the pearlescent pigment, by being encapsulated or "trapped" in one of the metal oxide layer on the pearlescent pigment. In this embodiment, the absorption pigment is preferably encapsulated in a layer of silicon dioxide, cerium dioxide, zirconium dioxide or aluminum oxide.

In the case where the transparent dye, organic pigment, organic pigment derivative or inorganic pigment is attached to the surface of the pearlescent pigment the transparent dye, organic pigment, organic pigment derivative or inorganic pigment may be present at a level that is about 1%-25% with respect to the total weight of the pearlescent pigment.

Depending on the final application of the transparent coating system and/or film, the binder composition may also be different. In one embodiment, the transparent coating system and/or film is a coating. In this embodiment, the coating system may be used with exterior architectural coatings, automotive coatings, roof coatings, window coatings, greenhouse coatings, plastic coatings, wood coatings, military coatings, powder coating, coil coatings, inks and other coatings known to those skilled in the art are suitable.

The transparent coating system and/or film may also be designed to be permanent or temporary. By permanent, it is meant that the coating remains on the substrate for at least one year. By temporary, it means that the coating can be washed off at will or seasonally depending on the needs of the system.

In one embodiment, the transparent coating system and/or film is an ink. In this embodiment, any types of ink including packaging inks, flexographic inks, screen inks, gravure inks, or ink jet inks are acceptable. If the pigments of the present technology are used in a packaging ink, then they may be used to color both the interior and the exterior of a package or other container.

The transparent coating system and/or film may be either water-based and/or solvent-based coating or ink formulations as well as energy curable coating and ink formulations.

According to the present technology, a crosslinker, water, an organic solvent, an interfacially active agent, a hardener, an ultraviolet absorber, a thickener, a corrosion inhibitor as well as other additives known in the art can be used to make the transparent coating system.

In one embodiment, the transparent coating system is liquid based. In this embodiment, the transparent polymeric binders used to make the transparent coating system may be one or more from the group of polyester, polyurethane, polyvinyl, polyacrylate, polyolefin, cellulose, polyamide, nitrocellulose, acrylic, alkyd, fluorinated resins or the like. Other binders known to those skilled in the art may also be used without affecting the scope of the current technology.

In one embodiment, the transparent coating system is according to the present technology a powder coating. In this embodiment, the transparent polymeric binders used to make the transparent powder coating system may be one or more from the group of, including binders from the group of polyester, polyurethane, polyacrylate, polyolefin, epoxy, polyamide, poly(vinyl chloride), and poly(vinylidene fluoride), as well as any acrylic, alkyd, fluoro resins, and the blends thereof. Additionally, to make a powder coating composition of the present technology, the pigments of the present technology can be blended, bonded, or extruded with the powder coating resin of the current technology according to methods known to those skilled in the art.

In one embodiment, the transparent coating system and/or film is a plastic film. In this embodiment, the plastic film according to the present technology is obtained by incorporating the pearlescent pigment and the transparent dye, organic pigment, organic pigment derivative and/or inorganic pigment into a plastic material and then making the film by blow molding, extrusion or other techniques used to make plastic films or articles known to those skilled in the art. Additionally, the pearlescent pigment and the transparent dye, organic pigment, organic pigment derivative and/or inorganic pigment may be applied to the surface of the plastic film.

In the case where the transparent coating system and/or film is a plastic film, the film may be used as a laminating film on a transparent substrate such as a window. In the case where the film is a laminating film on a window, the window may be made out of any optically clear material, such as glass, fiberglass, polycarbonate, polyethylene, or acrylic polymers.

The film may be a type of plastic sheeting that is mounted, draped or hung over an object. In the case where the film is a plastic sheeting, it may be mounted, draped or hung over a frame or scaffolding to filter the light entering the space enclosed by the frame or scaffolding. In the case where the film is mounted draped or hung over a scaffolding, it can be used to cover, for example, a structure where plants are grown, such as a greenhouse, and other structures known to those skilled in the art.

In the case where the transparent coating system and/or film is a plastic film, any suitable plastics may be used including one or more from the group including polypropylene, polyethylene, polystyrene, polymethyl methacrylate, polyester, polyether, polyurethane, polycarbonate, polyacrylate, polyvinyl, polyolefin, epoxy, polyamide, poly(vinyl chloride), and poly(vinylidene fluoride), as well as any acrylic, alkyd, fluoropolymers, and blends and copolymers thereof.

The present technology has been described in detail, including the different embodiments thereof. However, it will be appreciated that those skilled in the art, upon consideration of the present disclosure, may make modifications and/or improvements on this technology that fall within the scope and spirit of the technology.

EXAMPLES

The following examples illustrate specific aspects of the present technology and are not intended to limit the scope thereof in any respect and should not be so construed.

Example 1

25 g of 19.9% paste in water of an aluminum lake sulfonic acid derivative of C.I. pigment violet 19 of the following structure:

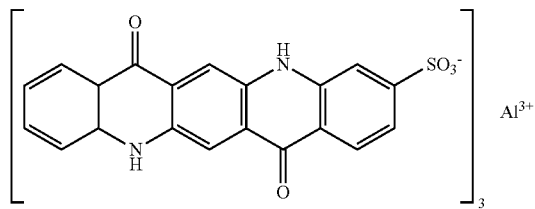

was dried before using. The aluminum lake sulfonic acid derivative of C.I. pigment violet 19 was added to a cellulose acetate butyrate/acrylate resin system at a loading of 2.8%. Additionally, 2.3% of a green-colored titanium dioxide coated mica pigment (10-60 µm) (281-1263, Sun Chemical, United States) was added to the cellulose acetate butyrate/acrylate resin system (DMR 499, PPG Industries, United States). The ingredients were mixed and then drawn down on a Mylar film using a #3 Byrd Applicator. The resulting film was magenta with a green reflection color.

Example 2

A green-colored titanium dioxide coated mica pigment (10-60 µm) (281-1263, Sun Chemical, United States) was added at a loading of 5% to a cellulose acetate butyrate/acrylate resin system. The ingredients were mixed and then drawn down on a Mylar film using a #3 Byrd Applicator. The resulting film was white with a green reflection color.

Example 3

0.75 g of C.I. Pigment Red 31 (Multifast Rubber Bordeaux, Clariant, Switzerland) was dispersed in ethanol and combined with 49.5 g of a green-colored titanium dioxide coated mica pigment (10-60 µm) (281-1267, Sun Chemical, United States). The mixture was filtered to remove excess ethanol and added at 5% total pigment loading to a cellulose acetate butyrate/acrylate resin system. The ingredients were mixed and then drawn down on a Mylar film using a #3 Byrd Applicator. The resulting film was magenta with a green reflection color.

Example 4

0.75 g of C.I. Pigment Red 31 (Multifast Rubber Bordeaux, Clariant, Switzerland) was dispersed in ethanol and combined with 49.5 g of a green-colored titanium dioxide coated mica pigment (10-60 µm) (281-1267, Sun Chemical, United States). The mixture was filtered to remove excess ethanol and dried. 4.0 g of the dried pigment blend is then mixed with 76.0 g low density polyethylene (LDPE). The pigment/LDPE mixture is added to a two-roll mill containing a 20 mil gap at 280° C. and milled for five minutes. The LDPE skin is removed from the mill and pressed out on a Carver press at 20,000 psi at 320° F. for 30 seconds. The resulting film was magenta with a green reflection color.

Example 5

The percent reflectance, percent transmission and percent absorbance spectra of the dried films of Inventive Example 1 and Comparative Example 2 were measured using a Perkin-Elmer Lambda 900 Spectrophotometer operating with the diffuse sphere geometry in the wavelength range of 300-2500 nm. The reflectance, transmission and absorption spectra for these examples were compiled in FIGS. 2-4, respectively.

Figure 2:
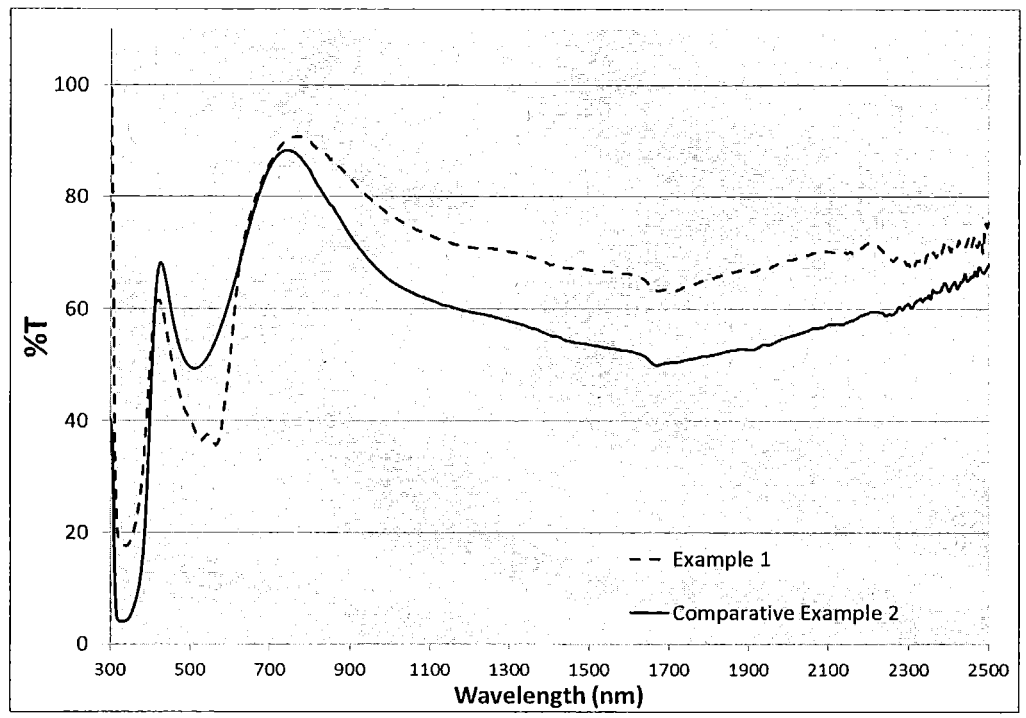
FIG. 2: Transmission spectra of Example 1 and Comparative Example 2
Figure 4:
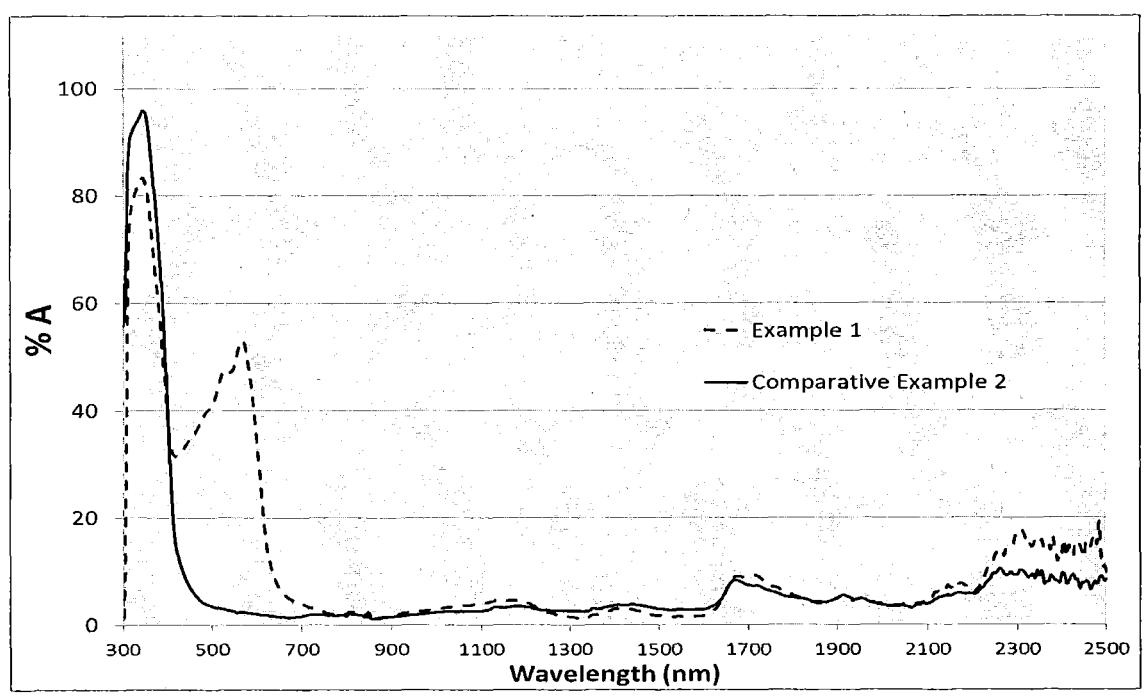
FIG. 4: Absorption spectra of Example 1 and Comparative Example 2

FIG. 2 shows the transmission spectra of Inventive Example 1 and Comparative Example 2. The transmission in the NIR (c.a. 780-2500 nm) of films in Inventive Example 1 and Comparative Example 2 shows that the spectral shape is nearly identical for the samples, however, Example 1 transmits less overall light in the NIR than Comparative Example 2. Example 1 and Comparative Example 2 transmit virtually no light in the ultraviolet (<380 nm). This is because the titanium dioxide on the surface of the pearlescent pigment strongly absorbs these wavelengths (FIG. 4). In the visible region, Comparative Example 2 shows a partial peak in the red region (630-700 nm) and a narrow peak in the blue region centered at 430 nm. Between these peaks there is a broad dip in the green to yellow region (500-600 nm). This results in a film that is white with a diffuse yellow to pink color when viewed through a Mylar film or over a white substrate. Conversely, Example 1 shows a large dip in the visible spectra in the green region with a more drastic transition from peak-to-trough than Comparative Example 2. This dip leads to an intensely colored film that appears magenta when viewed through a Mylar film or over a white substrate.

Figure 3:
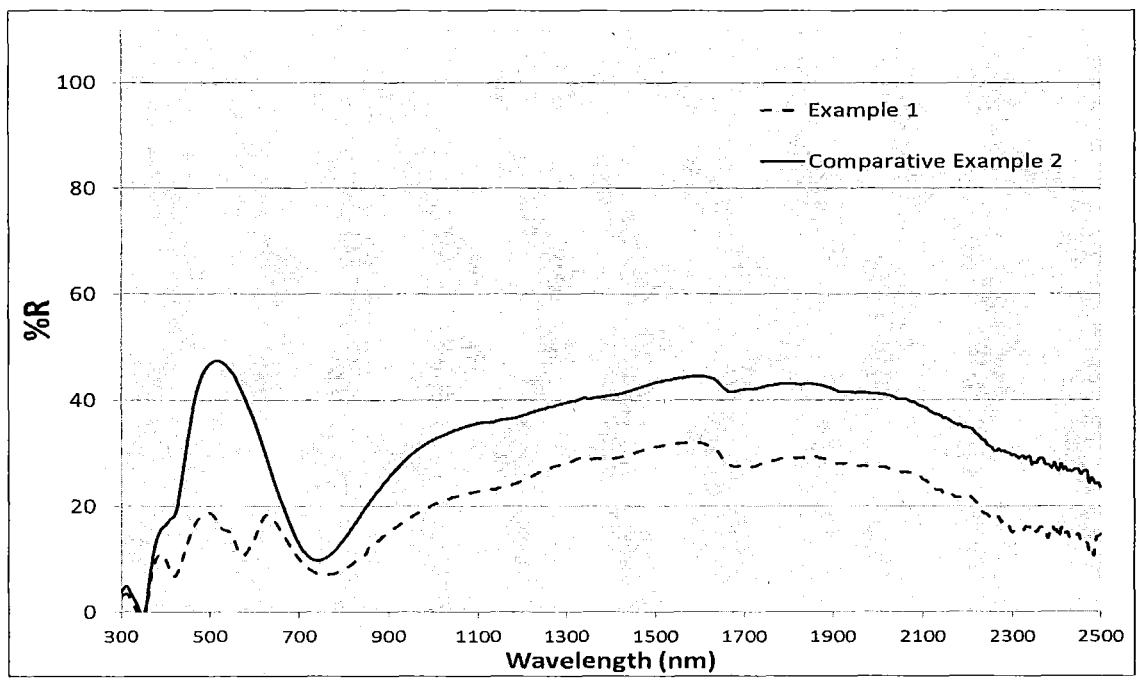
FIG. 3: Reflection spectra of Example 1 and Comparative Example 2

FIG. 3 shows the reflection spectra of Example 1 and Comparative Example 2. The reflection in the NIR (c.a. 710-2500 nm) of both Example 1 and Comparative Example 2 shows that the spectral shape is nearly identical for the three pigments, however, Example 1 reflects more light in the NIR than Comparative Example 2. Example 1 and Comparative Example 2 reflect virtually no light in the ultraviolet. This is because the titanium dioxide on the surface of the pearlescent pigment strongly absorbs these wavelengths (FIG. 4). In the visible region, Comparative Example 2 shows a broad peak in the blue-green region (470-580 nm) while relatively no light is reflected in the rest of the spectrum. This results in a film that looks green in reflection or when viewed over a black substrate. In comparison, the film of Example 1 has a much more complex visible spectrum that shows a series of narrow peaks. This is due to the combined absorption and interference of the pearlescent pigment and the aluminum lake sulfonic acid derivative of C.I. pigment violet 19 of Example 1.

FIG. 4 shows the absorbance spectra of Example 1 and Comparative Example 2. For Comparative Example 2, the absorbance spectrum is relatively featureless except for a large peak centered at 350 nm. This peak is due to ultraviolet light absorbance from the titanium dioxide on the pearlescent pigment of Comparative Example 2. For Example 1, there is a large peak in the visible region centered at c.a. 575 nm. This peak corresponds to the absorbance of the aluminum lake sulfonic acid derivative of C.I. pigment violet 19 for Example 1 which were used to make this film. Besides this peak, the spectra of Example 1 and Comparative Example 2 are identical.

The TST and TSR were calculated from the spectra of FIGS. 2 and 3, respectively, using Equations 1 and 2 and after subtracting the background using Equations 3 and 4. The values of these parameters are reported in Table 1 along with the Values recorded for tion pigments selected from organic pigments, organic pigment derivatives and/or inorganic pigments, having a total pigment loading; in a wet film, of between about 0.5%-20%, by weight; and wherein
  a. TSR of the pigment blend between the wavelengths of about 400 nm-2500 nm, is in the range of about 40%-85%; and
  b. TST of the pigment blend between the wavelengths of about 400 nm-2500 nm, is in the range of about 40%-85%; and
wherein the ratio of the
  percent transmission at 660 nm to the percent transmission at 730 nm is in the range of about 0.5-2.0.

2. The transparent coating system of claim 1, wherein the total pigment loading is about 5%, by weight.

3. The transparent coating system of claim 1, wherein the one or more absorption pigments selected from organic pigments, organic pigment derivatives and/or inorganic pigments are selected from C.I. Pigment Violet 14, C.I. Pigment Violet 15, C.I. Pigment Violet 16, C.I. Pigment Violet 19, C.I. Pigment Violet 23, C.I. Pigment Violet 55, C.I. Pigment Red 7, C.I. Pigment Red 31, C.I. Pigment Red 57:1, C.I. Pigment Red 101, C.I. Pigment Red 108, C.I. Pigment Red 122, C.I. Pigment Red 254, and C.I. Pigment Red 264.

4. The transparent coating system of claim 3, wherein the pearlescent pigment is comprised of a transparent, non-metallic, platelet-shaped substrate that is coated with one or more layers comprised of a metal oxide having a refractive index, and wherein the non-metallic platelet substrate is selected from natural mica, synthetic mica, bismuth oxychloride, graphite, aluminum oxide, micaceous iron oxide, perlite, silicon dioxide, titanium dioxide-coated mica, and iron oxide-coated mica.

5. The transparent coating system of claim 4, wherein the metal oxides are selected from silicon dioxide, titanium dioxide, zinc oxide, zirconium dioxide, tin oxide, cerium dioxide, vanadium (IV) oxide, manganese oxide, lead oxide, chromium oxide, iron oxide, aluminum oxide, tungsten oxide, and mixtures and alloys thereof, and wherein the metal oxide layer is in the range of about 20 nm to 350 nm.

TABLE 1

TSR and TST values at different wavelength ranges for the examples in the current technology

| Sample | TSR (400-2500 nm) | TST (400-2500 nm) | TSR (750-2500 nm) | TSR (400-750 nm) | TST (400-495 nm) | TST (495-590 nm) | TST (590-750 nm) |
|---|---|---|---|---|---|---|---|
| Ex. 1 | 16.1% | 65.6% | 21.3% | 12.4% | 57.6% | 38.1% | 75.9% |
| Ex. 3 | 17.2% | 76.9% | 18.7% | 15.3% | 69.6% | 60.7% | 83.7% |
| Comp. Ex. 2 | 24.7% | 68.8% | 23.2% | 27.2% | 58.2% | 56.4% | 80.1% |
| Ex. 4 | 25.8% | 48.5% | 30.3% | 21.9% | 30.6% | 18.5% | 59.1% |

As seen in Table 1, Examples 1 and 3 and Comparative Example 2 have similar amounts of solar transmission. Example 1 has more drastic changes in the light transmission in the visible range, especially in the green (495-590 nm) region of the spectrum. The differences are more pronounced when looking at Example 3. This is due to the combined effect of adding a traditional colorant with a pearlescent pigment. Finally, Example 4 shows TSR and TST values that are in line with those seen in Example 3.

What is claimed is:

1. A transparent coating system for light filtering between 400-2500 nm, comprised of a transparent polymeric binder, one or more pearlescent pigments, and one or more absorp- 6. The transparent coating system of claim 1, wherein the coating has a tailored transmission spectrum for use in greenhouse applications.

7. The transparent coating system of claim 1, wherein the pearlescent pigments, and one or more absorption pigments selected from organic pigments, organic pigment derivatives and/or inorganic pigments are added to the transparent coating system either as dry colors or as a predispersed tinting base.

8. The transparent coating system of claim 1, wherein the total pigment loading is about 5%, by weight, and wherein:
  a. TSR of the pigment blend between the wavelengths of 750 nm-2500 nm, is in the range of 10%-40%; and b. TSR of the pigment blend between the wavelengths of about 400 nm-750 nm, is in the range of about 5%-35%; and c. TST of the pigment blend between the wavelengths of about 400 nm-2500 nm, is in the range of about 40%-85%.

9. A transparent coating system for light filtering between 400-2500 nm, that is comprised of a transparent polymeric binder, one or more pearlescent pigments, and one or more absorption pigments selected from organic pigments, organic pigment derivatives and/or inorganic pigments, having a total pigment loading in a wet film, is between about 0.5%-20%, by weight; and
wherein
the TST of the pigment blend at about 5% total pigment loading is in the range of:
  a. about 40%-70% between the wavelengths of 400 nm and 495 nm;
  b. about 25%-65% between the wavelengths of 495 nm and 590 nm; and
  c. about 60%-95% between the wavelengths of 590 nm and 750 nm; and
the TSR of the pigment blend between the wavelengths of about 400 nm-2500 nm, is in the range of about 10%-40%; and
wherein the ratio of the
percent transmission at 660 nm to the percent transmission at 730 nm is in the range of about 0.5-2.0.

10. The transparent coating system of claim 9, wherein the one or more absorption pigments selected from organic pigments, organic pigment derivatives and/or inorganic pigments are selected from C.I. Pigment Violet 14, C.I. Pigment Violet 15, C.I. Pigment Violet 16, C.I. Pigment Violet 19, C.I. Pigment Violet 23, C.I. Pigment Violet 55, C.I. Pigment Red 7, C.I. Pigment Red 31, C.I. Pigment Red 57:1, C.I. Pigment Red 101, C.I. Pigment Red 108, C.I. Pigment Red 122, C.I. Pigment Red 254, and C.I. Pigment Red 264.

11. The transparent coating system of claim 10, wherein the pearlescent pigment is comprised of a transparent, non-metallic, platelet-shaped substrate that is coated with one or more layers comprised of a metal oxide having a refractive index, and wherein the non-metallic platelet substrate is selected from natural mica, synthetic mica, bismuth oxychloride, graphite, aluminum oxide, micaceous iron oxide, perlite, silicon dioxide, titanium dioxide-coated mica, and iron oxide-coated mica.

12. The transparent coating system of claim 11, wherein the metal oxides are selected from silicon dioxide, titanium dioxide, zinc oxide, zirconium dioxide, tin oxide, cerium dioxide, vanadium (IV) oxide, manganese oxide, lead oxide, chromium oxide, iron oxide, aluminum oxide, tungsten oxide, and mixtures and alloys thereof, and wherein the metal oxide layer is in the range of about 20 nm to 350 nm.

13. The transparent coating system of claim 9, wherein the coating has a tailored transmission spectrum for use in greenhouse applications.

14. The transparent coating system of claim 9, wherein the pearlescent pigments, and one or more absorption pigments selected from organic pigments, organic pigment derivatives and/or inorganic pigments are added to the transparent coating system either as dry colors or as a predispersed tinting base.

* * * * *